United States Patent [19]

Hagiwara et al.

[11] Patent Number: 4,683,093
[45] Date of Patent: Jul. 28, 1987

[54] METHOD FOR HOLDING A MOVING FILM

[75] Inventors: Satoru Hagiwara; Kimio Satoh, both of Otsu; Kazuo Okabe, Shiga, all of Japan

[73] Assignee: Toray Industries, Inc., Tokyo, Japan

[21] Appl. No.: 795,457

[22] Filed: Nov. 6, 1985

[30] Foreign Application Priority Data

Nov. 6, 1984 [JP]   Japan ................................ 59-232467

[51] Int. Cl.⁴ ............................................. B29C 55/06
[52] U.S. Cl. ......................................... 264/22; 26/71; 264/288.4; 425/174.8 E
[58] Field of Search ................. 264/22, 288.4, 290.2; 425/174.8 E; 26/71

[56]  References Cited

U.S. PATENT DOCUMENTS 3,619,460  11/1971  Chill .................................. 264/288.4
4,477,407  10/1984  Hethington et al. ............. 264/288.4

FOREIGN PATENT DOCUMENTS 2257089   5/1973  Fed. Rep. of Germany ... 264/288.4
55-27270  2/1980  Japan .
27270     2/1980  Japan ............................. 264/288.4
6723      1/1982  Japan ............................. 264/288.4
45028     3/1983  Japan ................................. 264/22

Primary Examiner—James Lowe
Attorney, Agent, or Firm—Birch, Stewart, Kolasch & Birch

[57]  ABSTRACT

The present invention relates to a method for holding a moving film comprising bringing each surface of a set of conductive rolls into contact with a front surface and a back surface of a moving film respectively, at least one of the surfaces of the set of rolls being constructed of an elastomer, and holding the moving film by the surfaces of the set of rolls while establishing a high electric potential difference between the set of rolls.

The present invention provides a useful method for conveying or stretching the film at high speed without operational troubles, thereby providing a strong film free from scratches or foreign particles on the surface.

16 Claims, 11 Drawing Figures

FIG. I
PRIOR ART
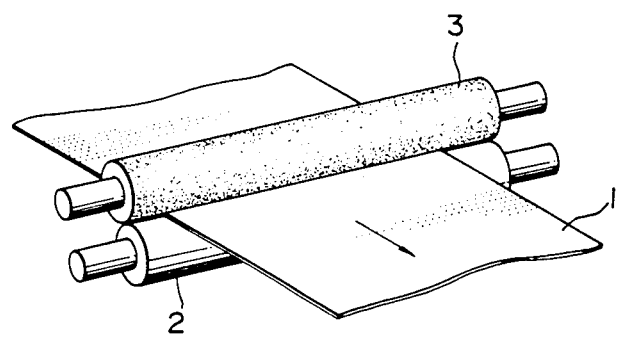
FIG. 2
PRIOR ART
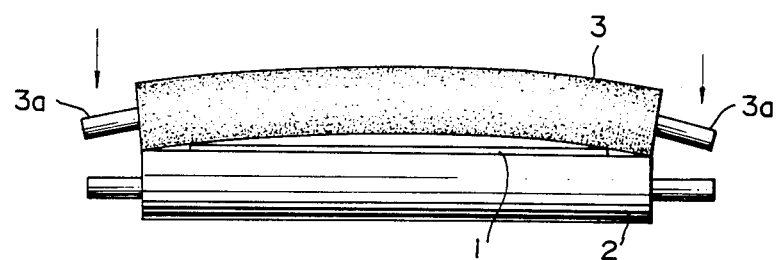

FIG. 3A-1
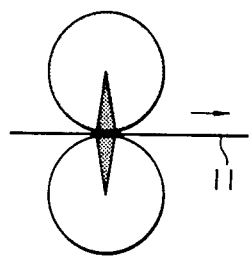
FIG. 3B-1        FIG. 3B-2        FIG. 3B-3
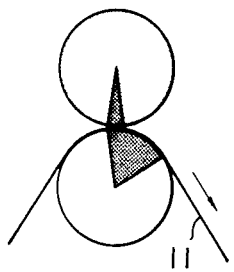 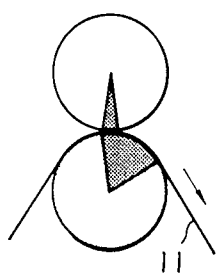 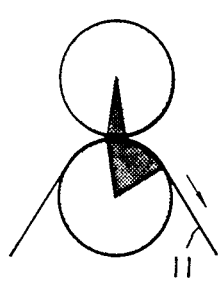
FIG. 3C-1        FIG. 3C-2        FIG. 3C-3
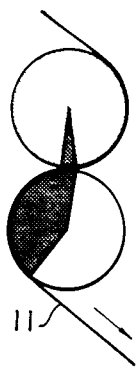 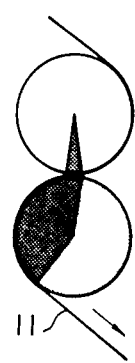 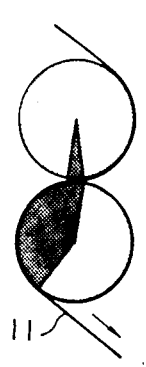

METHOD FOR HOLDING A MOVING FILM

BACKGROUND OF THE INVENTION

1. Field of the Invention

The present invention relates to a method for holding a moving film, and more specifically to a method for holding a thermoplastic polymeric film which is to be continuously stretched while being conveyed.

2. Decription of the Prior Art

In the prior art it is well known to hold a moving film from both side surfaces of the film by the nip of a set of rolls so that the tension of the film can be isolated over the full width of the film when conveying the film or when stretching the film. For example, there is a method, as illustrated in FIG. 1, in which a drive roll 2 fixed in a vertical direction is installed at the lower side of a moving film 1. A free roll 3, movable vertically, is installed above the roll 2 and the film 1 is held between rolls 2 and 3, by pressing down roll 3 and thereby nipping the film 1 between the rolls. In this method, roll 3 is usually pressed down by applying the force at both axes of the roll 3, and the surface of at least one of these rolls 2 and/or 3 is often constructed of an elastomer so that the nip force generated between the rolls 2 and 3 can be maintained as uniform as possible in the direction along the axes of rolls 2 and 3.

In this method, however, when the film is wide, it becomes difficult to nip the film uniformly in the direction of the film width. As illustrated in FIG. 2, when the film 1 is wide, the rolls 2 and 3 should be correspondingly long. Therefore, when the axis 3a, 3a of the roll 3 are pressed down, the roll 3 is liable to bend. The bending of the roll 3 causes the nip force produced in the middle portion of the film in the direction of the film width to decrease; and in the worst case a gap will appear between the surface of the roll 3 and the film 1 and at this gap the film 1 will not be held. Once such a state of uneven nip is produced, not only does tension isolation over the full width of the film 1 become difficult, but the film 1 may slip and become scratched at the central position of the film. For preventing bending of the roll, it would be effective to increase the roll diameter and thereby increase the strength of the roll, but this would lead to increased dimensions of the device.

Further in this method for holding the film, tension acts on the surface of the nip roll 3 constructed of the elastomer and as a result the surface of roll 3 is abraded, producing an abraded powder which sticks to the film. For the purpose of resolving the disadvantages accompanying widening of the film such as roll bending, scratching of the film surface and abrasion of the elastic roll surface, U.S. Pat. Nos. 3,068,528, 3,645,299 and Japanese patent publication No. SHO 55-27270 disclose methods using a charging electrode to deposit an electric charge on the surface of the film and holding the electrically charged film on the roll surface without using the nip roll.

According to these methods disclosed, however, since it is necessary to ionize the air by means of a charging electrode out of contact with the film, the tip of the electrode is made as sharp as possible so that the electrostatic field gradient in proximity to the electrode can be maximized. Besides, when the air is ionized in the area close to the film, a spark may be discharged through the film. Therefore, an adequate gap must be maintained between the film and the electrode. Thus, in the prior art, it has been necessary to place a sharp electrode, such as a wire, a knife, a band or a needle at an appropriate distance from the film. In any case, however, the trouble has been that a wire electrode is liable to snap, and a knife, band or needle electrode is liable to break at the tip. Each of the above-mentioned methods involves operational or functional problems such as difficulty of maintaining a uniform gap between the electrode and the film in the direction of the film width when the film is widened or such as a local discharge due to micro irregularity of the electrode tip.

Meanwhile, investigations by the inventors of the present invention have revealed that the electric adhering force of the film to the roll tends to drop, as the speed of the moving film increases, when the charging electrode of the prior art is employed. Accordingly, since a fast moving film will not reliably adhere to the roll when the prior art process of conveying a film fast is practiced, for instance during a high-speed film-stretching process, scratching of the film surface is unavoidable. This problem of scratching has been a great hindrance to the speedup of film-making.

The incidence of scratching tends to increase when the stretching tension of the film is increased by increasing the stretching ratio of the film. In the case of polyester film or the like, normally an increase in the stretching ratio results in an increased film strength. However, in the prior art the increase of film strength through the increased stretching ratio and the production of the film without a scratched surface are conditions contradictory to each other and thus it has been impossible to obtain a film which is scratch-free and at the same time strong enough.

The above-mentioned scratching is a fatal defect especially to a base film for magnetic recording which requires the highest surface smoothness, among all types of films. Meanwhile, increasing film strength has been an urgent demand of the base film for long-time magnetic recording which is made especially thin.

SUMMARY OF THE INVENTION

An object of the present invention is to provide a method for holding a moving film on a roll without slipping.

Another object of the present invention is to provide a method for stretching a moving film without scratching the surface and without foreign particles sticking to its surface.

Further, another object of the present invention is to provide a method for holding a fast moving film on a roll without slipping.

Yet, another object of the present invention is to provide a method for holding a moving film without slippage on a roll without the above-mentioned operational or functional disadvantages.

Still another object of the present invention is to provide a method for producing a film which has a surface without scratches and high strength.

To accomplish these objects, a method for holding a moving film according to the present invention comprises bringing each surface of a set of conductive rolls into contact with a front surface and a back surface of a moving film respectively, at least one of the surfaces of the set of rolls being constructed of an elastomer and holding the moving film by the surfaces of the set of rolls while establishing a high electric potential difference between the set of rolls.

According to the present invention, at least one of the set of rolls must have its surface made of an elastomer. The elastomer-surface roll considered here has desirably a surface hardness of not greater than 90° according to the JIS K 6301-1975 Hardness Test, more desirably a surface hardness of not greater than 80° and not less than 60°. The other roll in the set of rolls may have an surface constructed of an elastomer or a rigid material. The rigid material mentioned here refers to a Vickers hardness of not less than 500. Both rolls desirably have their surfaces made of a highly wear-proof material against a moving film so that abrasion products therefrom may not penetrate the film. Thus, the elastic materials recommended include elastomers of polyolefin base or silicone base, while the rigid materials recommended include a variety of metals (such as iron, chromium, nickel, or the like). The roll diameter is not particularly specified; it is preferably over 10 mm, and normally will be in the range of from 50–300 mm.

According to the present invention, at least one of the rolls should be conductive. This means that the roll surface is conductive. Establishing of a high potential difference between the roll means such that a high potential difference is developed between the roll surfaces. Conductivity of the roll surface, in the case of an elastomer-surface roll, can be realized through the addition of carbon or any other conductive filler to the elastomers or through formation of a conductive layer on the roll surface by applying a conductive coating material on the roll surface. In the case of a rigid roll, it can be easily realized through adoption of a common conductive metal. Conductivity in the present invention refers to a volume resistivity being not greater than $10^8$ ohm.cm, desirably not greater than $10^5$ ohm.cm, more desirably not greater than $10^2$ ohm.cm. The high potential difference to be established between the rolls according to the present invention should be such a voltage that it is less than the insulation break down voltage of the moving film in that it can produce an adhering effect of the film to the roll; to be specific, it is desirably 100–10,000 V or more, desirably 300–3,000 V. Moreover, it is desirable that the fluctuation of the potential difference be small. To be specific, the fluctuation ratio of the potential difference is desirable less than 5%.

As the most typical method which can easily minimize fluctuation of the potential difference, a method is well known in which one roll of the set of rolls is grounded and a high D.C. voltage is applied to the other roll, but the present invention is not restricted by only this method for minimizing the fluctuation. When a high potential difference is established between the two rolls across the moving film, a current flows from one roll to the other roll and a current due to the electric charge deposited on the film flows from the film to the roll, but the magnitude of the current itself differs corresponding to the physics and moving speed of the film, the voltage and other factors.

In the present invention, the high potential difference between the roll surfaces may be realized by any one of the following methods: a method of applying a voltage after insulating the rolls themselves from the ground by fabricating the bearings in both rolls of an insulating material; a method, such as the above-mentioned method, of insulating only one roll from the ground and grounding the other roll; or a method of making the surface layer alone conductive and insulating an inner layer from a core of the roll by fabricating the inner layer of an insulating material, and then applying a high voltage only to the surface layer by a means such as a feeding brush.

In this manner, by developing a high potential difference between a set of rolls, an electric charge is deposited to a moving film between the roll surfaces, and the film adheres to the roll surface by an electrostatic force due to the electric charge. At the same time, when a high potential difference is established between a set of rolls, an electrical attractive force acts between the two rolls to attract the opposing roll surfaces to each other, and the attractive force works as an approximately uniform force over the entire roll length, because the potential difference between the rolls is almost constant over the entire roll length. Since at least one of the roll surfaces is constructed of an elastomer, the electrical attractive force working between the rolls has such an effect that the elastomer surface of the roll is so deformed as to hold the moving film evenly in the longitudinal direction of the roll. Further, since the set of rolls are in contact with both side surfaces of the film, these rolls have the same nip effect for holding a moving film as in the case of simple nip rolls in the prior art. However, as the holding force of this nip, it is not necessary that the force be as large as to cause roll bending, because there are the film-to-roll adherence due to the electric charge and the roll-to-roll attraction due to the high potential difference. Therefore, if the holding force due to the electric charge and the attractive force between the rolls is sufficiently large, the roll surfaces will have only to softly touch the film surfaces, for holding the film between the rolls.

Thus in accordance with this invention, a moving film is held between two rolls in contact with the film mechanically. Therefore, the problem in the prior art, for example, the difficulty of maintaining a uniform gap between an electrode and the film in the film width direction, can be eliminated. Moreover, since the force for holding the film is obtained as the sum of the adhering force of the film to the roll due to the electric charge, the holding force of the elastomer roll surface due to the attractive force developed between the roll surfaces by establishing a high potential difference and the nip force between the two rolls, a large enough holding force for the moving film can be obtained even in the case of a fast moving film without developing such a large nip force so as to cause roll bending. As a result, isolation of high tension of the film is made possible and it also becomes possible to prevent scratching of the film, raise the film manufacture speed, and moreover it becomes possible to increase the stretching ratio of the film.

BRIEF DESCRIPTION OF THE DRAWINGS

The above objects, features and advantages of the present invention will become apparent and more readily appreciated from the following detailed description of exemplary embodiments of the present invention taken in conjunction with the accompanying drawings, wherein:

FIG. 1 is an oblique view of nip rolls of the prior art showing a method for holding a film between the rolls;

FIG. 2 is a front elevational view of nip rolls of the prior art showing a state of roll bending;

FIGS. 3A-1 to 3C-3 are schematic views showing positional relationships between a set of rolls and a moving film according to the present invention;

DETAILED DESCRIPTION OF THE INVENTION

To explain the positional relationship between a set of rolls and a moving film in this invention, FIG. 3 schematically shows the roll-film relationships. In FIG. 3, A-1, B-1,2,3 and C-1,2,3 are typical relationships between rolls and a moving film 11 (pass lines) satisfying the conditions of the present invention. In the figures a blank circle represents a roll having a rigid surface and a shaded circle represents a roll having an elastomer surface. An arrow indicates the moving direction of the film 11. Reference number 3A-1 shows a state in which the film runs straight without wrapping on the rolls. Reference numbers 3B-1,2,3 indicate states in which the film 11 runs wrapping on only one roll. Reference numbers 3C-1,2,3 indicate states in which the film 11 runs wrapping on both rolls. The solid black sector of each roll indicates the portion of the roll surface to which the moving film 11 electrostatically adheres and this portion is called an electrostatic adherence zone in the present invention. The longer the electrostatic adherence zone, the larger will be the film-holding force with a greater advantage. For this reason, 3B-1, 2, 3 and 3C-1, 2, 3 will be preferable to 3A-1 as pass lines in FIG. 3.

Usually an elastomer-surface roll is less wear-resistant and more liable to abrasion than a rigid-surface roll and therefore a pass line on which the film 11 exerts a large frictional force is not recommended and the line in 3B-1 is found preferable. To be specific, the electrostatic adherence zone is desirably established over 15 mm in length; a more desirable condition will be when an electrostatic adherence zone longer than 15 mm is on a rigid-surface roll. Further, an electrostatic adherence zone longer than 50 mm would be still more desirable.

In this invention, use of a moving film with a volume resistivity of not less than $10^9$ ohm.cm is recommended for the purpose of obtaining an electrostatic adherence effect between the two rolls with a high potential difference. Thus the method according to the present invention is applicable to a wide variety of non-conductive thermoplastic polymeric films including polyolefins such as polyethylene, polypropylene, polyesters such as polyethyleneterephthalate, polyamides such as nylon and polyimides. Especially when a biaxially stretched film of polyesters, such as polyethyleneterephthalate, is to be re-stretched, the method according to the present invention is highly effective as a means to prevent scratching of the film stretched between stretching rolls. A biaxially stretched film thus re-stretched in the longitudinal direction is called a "tensilized film", which is highly useful as a base film for magnetic recording medium.

Figure 4:
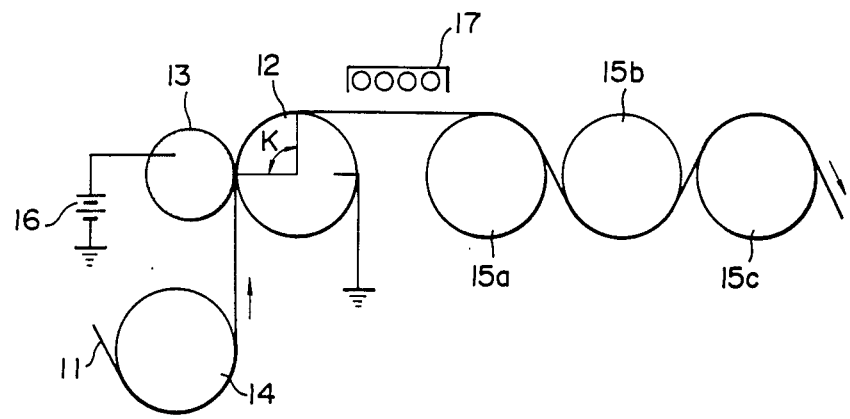
FIG. 4 is a schematic view of a film stretching device showing an embodiment of the present invention.
Figure 5:
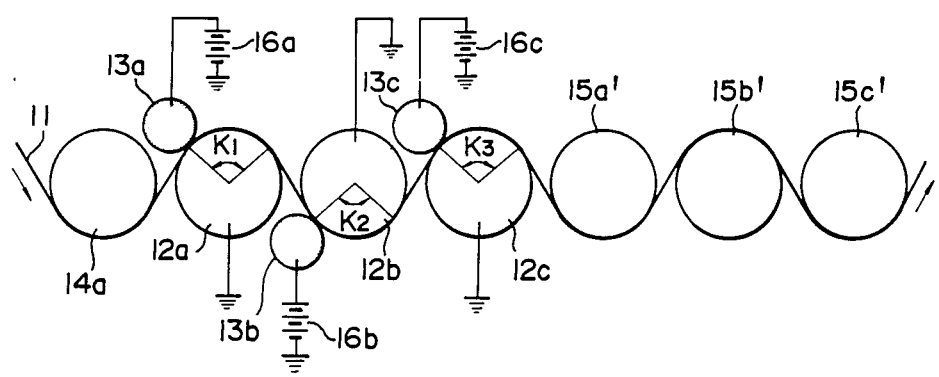
FIG. 5 is a schematic view of a film stretching device showing another embodiment of the present invention.

Next, referring further to the drawings, the embodiments of the present invention will be further explained, but the present invention is not confined to these embodiments. FIGS. 4 and 5 schematically illustrate embodiments of the present invention being applied to the film-stretching process. In these figures, 11 is a moving film, 12, 12a, 12b and 12c are stretching rolls, 13, 13a, 13b and 13c are opposing rolls, 14 and 14a are preheating rolls, 15a, 15b, 15c, 15a', 15b' and 15c' are cooling rolls, 16, 16a, 16b and 16c are high voltage supplies and 17 is an auxiliary heater. A high potential difference is derived from the high voltage supplies 16, 16a, 16b and 16c between the rigid-surface stretching rolls 12, 12a, 12b and 12c and the elastomer-surface opposing rolls 13, 13a, 13b and 13c. In these figures, the stretching rolls 12, 12a, 12b and 12c are grounded, while the opposing rolls 13, 13a, 13b and 13c are applied with a high D.C. voltage. In FIGS. 4 and 5, the film 11 contacts the preheating rolls 14 and 14a, to be heated to an appropriate temperature. It is then conveyed to the stretching rolls 12, 12a, 12b, and 12c, thereafter stretched in the moving direction by a peripheral speed difference between the stretching rolls 12, 12a 12b, 12c and the cooling rolls 15a, 15b, 15c, 15a', 15b', 15c' and it is sent to a following process. The thickness and width of the film 11 are appropriately selected to suit the purpose and they are not limited. In this embodiment of stretching, the film thickness differs before and after stretching, but the thickness before stretching is generally in the range of from 0.003 mm–3 mm and the width, before stretching, is generally in the range of 300 mm–7,000 mm.

The diameter and width of the preheating rolls 14, and 14a are selected depending on the thickness and width of the film 11. The temperature of the roll surface in such a stretching process as this embodiment is set at an appropriate value for stretching the film. As mentioned above, the stretching rolls 12, 12a, 12b, 12c are preferably made of metals which are highly wear-resistant and free from surface abrasion, and therefore, usually rolls having their surfaces finished with hard chrome-plating are employed. These rolls 12a, 12b, 12c are heated to an appropriate temperature depending on the stretchability of the film. In FIG. 4, the stretching roll 12 is a drive roll, but as shown in FIG. 5, there are often the cases that a plurality of free rolls 12a, 12b, 12c constitute stretching rolls . The moving film 11 comes into contact with the opposing rolls 13, 13a, 13b, 13c at such a position that the film 11 can have an electrostatic adherence zone of more than 15 mm, desirably not less than 50 mm in length on the stretching rolls 12, 12a, 12b and 12c. Putting the radius of the stretching rolls 12, 12a, 12b, 12c as r and the wrap angles of the film 11 around the stretching rolls 12, 12a, 12b, 12c respectively as K, $K_1$, $K_2$, $K_3$ radians, the electrostatic adherence zones will be expressed as rxK, rx$K_1$, rx$K_2$ and rx$K_3$.

The electrostatic adhering force of the film 11 to the stretching rolls 12, 12a, 12b, 12c will be the larger, the less wide the gap between the film portion not contacting the stretching roll and the surface of the stretching roll. Meanwhile, as the moving speed of the film 11 increases, the force of widening the gap mentioned above, due to the air-flow co-running with the surfaces of the film and the rolls, will increase. Thus it would be desirable, as illustrated in FIGS. 4 and 5, for the opposing rolls 13, 13a, 13b, 13c to be located as close as possible to a starting point of contact between the rolls 12, 12a, 12b, 12c and the moving film 11 so that the co-running air-flow can be suppressed as much as possible and the electrostatic adhering force of the moving film 11 to the surfaces of the rolls 12, 12a, 12b, 12c can be increased. The above-mentioned location of the opposing rolls 13, 13a, 13b, 13c would naturally contribute to increasing the length of the electrostatic adherence zone as much as possible.

The opposing rolls 13, 13a, 13b, 13c are desirably in even contact with the moving film 11 over the whole width of the film 11, but the nip force , i.e. the force of pressing the rolls 13, 13a, 13b, 13c down to the stretching rolls 12, 12a, 12b, 12c need not be so large as in the prior art illustrated in FIG. 1. The opposing rolls 13, 13a, 13b, 13c have only to come into contact with the film softly over the full width of the film 11. An excessive nip force of the opposing roll will be undesirable, because it will cause roll bending as aforementioned.

When a high potential difference is established between the opposing rolls 13, 13a, 13b, 13c and the stretching rolls 12, 12a, 12b, 12c, an electric attractive force which acts to attract the rolls to each other corresponding to the potential difference is generated between the roll surfaces. This attractive force is naturally generated over the entire length of the roll. Therefore the surfaces of the opposing rolls 13, 13a, 13b, 13c are desirably constructed of an elastic material which permits development of an uniform adherence of the roll surfaces to the film 11 when the electrical attractive force acts. In a case that a uniform adherence cannot be secured by only the electrical attractive force developed under the various conditions of voltage, it will be desirable to press both ends of the rolls 13, 13a, 13b, 13c by means of an air cylinder or the like with a force not so large as to cause roll bending. Since the high potential difference between the stretching rolls 12, 12a, 12b, 12c and the opposing rolls 13, 13a, 13b, 13c is maintained by the film 11 between the rolls serving as an insulating means, direct contact of these rolls, with no presence of the film 11, is undesirable. For this reason, the length of the surfaces of the opposing rolls 13, 13a, 13b, 13c in the direction along the axes thereof are designed less than the width of the moving film 11.

The moving film 11 electrostatically adhering to the stretching rolls 12, 12a, 12b, 12c by the high potential difference between the stretching rolls 12, 12a, 12b, 12c and the opposing rolls 13, 13a, 13b, 13c is not stretched over its portion contacting the stretching rolls 12, 12a, 12b, 12c. The film 11 is stretched depending on a stretching ratio matching the peripheral speed ratio between the rolls and stretched in the zone extending from a point where the film comes off the stretching rolls 12, 12a, 12b, 12c to a point where the film comes into contact with the cooling rolls 15a, 15a'. In FIG. 4, the film 11 is stretched between the streching roll 12 and the cooling roll 15a and in the stretching zone the film temperature may be controlled in a range appropriate to stretching by means of an auxiliary heater 17, as illustrated. In FIG. 5, the film 11 is stretched between the preheating roll 14a and the cooling roll 15a, and since the stretching rolls 12a to 12c are free rolls, they rotate corresponding to the stretching pattern of the film 11 between the preheating roll 14a and the cooling roll 15a'. Therefore, the peripheral speed is faster in the order of 12a, 12b and 12c. Here again no stretching takes place in the zone in which the film 11 comes into contact with the stretching rolls 12a, 12b, 12c because the moving film 11 adheres electrostatically to the stretching roll surfaces. Thus in FIG. 5, the film 11 is stretched stepwise in the zone of no contact with the preheating roll 14a, the stetching rolls 12a, 12b, 12c and the cooling roll 15a'. In the stepwise stretching, as illustrated in FIG. 5, the thickness of the film 11 changes also stepwise and, as a result, the condition of the optimum voltage which should be applied by the high voltage supplies 16a, 16b, 16c changes depending on the film thickness. Thus, the voltage supplies 16a, 16b, 16c are desirably provided as separate units.

The cooling rolls 15a, 15b, 15c, 15a', 15b', 15c' rotate at a peripheral speed which is equal to the peripheral speed of the preheating rolls 14, 14a multiplied by the stretching ratio, and they cool the moving film 11 rapidly to a temperature below the glass transition temperature. Of course, the temperatures of the rolls 15a, 15b, 15c, 15a', 15b', 15c' are kept at a temperature below the glass transition temperature of the film 11.

As described above, the method according to the present invention excels in the capacity to hold a moving film on a roll while conveying the film and it can generate a uniform adhering force of the film to the rolls over the entire width of the film. Even when the film is moving fast, it can develop the necessary adhering force of the film to the roll, and it can transparent the film without a scratching on the surface of the film. Particularly the method according to the present invention is found valuable as a means to firmly hold a thin and wide film already stretched in the width direction over its entire width, and it would be useful as adapted to some of the stretching rolls for the manufacture of the "tensilized film" to be re-stretched longitudinally.

PREFERRED EMBODIMENTS

Practical examples and effects of the present invention will be described referring to FIG. 4. EXAMPLE 1:

A polyethylene telephthalate film 30 micron thick and 5,000 mm wide which had been stretched biaxially under the condition of the stretching ratio of 3.5 times in the longitudinal direction and 3.5 times in the transverse direction was submitted to the device of FIG. 4 at various conveying speeds. The stretching roll 12, the preheating roll 14, and the cooling rolls 15a to 15c were 250 mm in diameter, 6,000 mm in length with the surface hard chrome-plated. The opposing roll 13 was a free roll of which the surface is constructed of silicone rubber to which carbon has been added, having a volume resistivity of $10^2$ ohm.cm and having a hardness of 70° according to JIS K 6301-1975 Hardness Test, its diameter being 150 mm. The positional relationship between the stretching roll 12, the opposing roll 13 and the film 11 held between them is illustrated in FIG. 4. The opposing roll 13 was uniformly pressed against the stretching roll 12 with a pressure of 100 kg/total width so that the roll 13 might not bend. The electrostatic adherence zone on the stretching roll 12 was 195 mm in length. The opposing roll 13 was insulated with a bearing constructed of 6-nylon and applied with 1.2 KV from the high voltage supply 16. The stretching roll 12 was grounded, and a potential difference of 1.2 KV was developed between the stretching roll 12 and the opposing roll 13. The preheating roll 14 was heated to 95° C. with hot water therein and the stretching roll 12 was heated to 130° C. with steam therein. The cooling rolls 15a, 15b, 15c were cooled to 25° C. with cooling water therein. The auxiliary heater 17 was designed for 20 KW/6,000 mm width. Under these conditions the moving film 11 was stretched at various moving speeds, and various stretching ratios between the stretching roll 12 and the cooling rolls 15a to 15c. The stetched film was checked for surface damage and the results as listed in Table 1 were obtained; the criteria for evaluation of Table 1 are given in Table 2.

COMPARISON 1

The opposing rolls 13 were omitted, instead a wire electrode of 0.2 mm in diameter was set at a position 12 mm above the stretching roll 12 and the film 11 was moved between the wire and the roll 12, on the roll 12. The wire electrode was applied with a D.C. voltage of 14 KV, otherwise the conditions of stretching were the same as in Example 1. The stretched film 11 was checked for surface damage, the results being listed in Table 1.

COMPARISON 2

The opposing roll 13 was omitted; otherwise the conditions of stretching were the same as in Example 1. The stretched film 11 was checked for surface damage, the results being listed in Table 1.

TABLE 1

| Moving speed of film | Stretching ratio | Surface damage level | | | | | |
|---|---|---|---|---|---|---|---|
| | | Criteria A | | | Criteria B | | |
| | | Ex. 1 | Comp. 1 | Comp. 2 | Ex. 1 | Comp. 1 | Comp. 2 |
| 100 m/min. | 1.4 | | | Δ | | Δ | X |
| 100 m/min. | 1.8 | | Δ | X | | X | X |
| 150 m/min. | 1.4 | | Δ | Δ | | X | X |
| 150 m/min. | 1.8 | | X | X | | X | X |

TABLE 2

| | Criteria A (by nacked eyes) | Criteria B (magnified 50 times by microscope after vapor-deposit of film with Al) |
|---|---|---|
| | Number of scratches longer than 500 micron: 0/100 cm² | Number of scratches 30–500 micron long: 0/100 mm² |
| Δ | Number of scratches longer than 500 micron: 1–20/100 cm² | Number of scratches 30–500 micron long: 1–20/100 mm² |
| X | Number of scratches longer than 500 micron: more than 20/100 cm² | Number of scratches 30–500 micron long: more than 20/100 mm² |

As is evident from Table 1, the method according to the present invention causes no scratches (Example 1) compared with the method not utilizing the electrostatic adherence effect (Comparison 2) and fewer scratches than the method of the prior art employing a non-contact electrode (Comparison 1). It is seen that the advantage of the method according to the present invention compared with the prior art is greater, the larger the stretching ratio of the film and the faster the speed of the moving film.

As obvious from the above description, the method according to the present invention can stretch the film at higher speed and without scratching even at higher stretching ratio than the prior art.

Although only preferred embodiments of the present invention have been described in detail, it will be appreciated by those skilled in the art that various modifications can be made to the particular embodiments shown without materially departing from the novel teachings and advantages of the invention. Accordingly, it is to be understood that all such modifications and alterations are intended to be included within the scope of the invention as defined by the following claims.

What we claim is:

1. A method for holding a moving film comprising the steps of:
   bringing each surface of at least one set of conductive rolls having conductive surfaces into contact with a front surface and a back surface of a moving film respectively, at least one of the surfaces of said set of rolls being constructed of a conductive elastomer; and
   holding said moving film by said surfaces of said rolls while establishing a high electric potential difference between said surfaces of said rolls.

2. The method of claim 1, wherein said moving film is stretched longitudinally between said at least one set of conductive rolls and additional rolls having different peripheral speeds from the peripheral speed of said at least one set of rolls.

3. The method of claim 2, wherein said moving film is a film which has been prestretched, at least biaxially.

4. The method of claim 2, wherein there are provided a plurality of said set of conductive rolls in the conveying direction of said moving film upstream from said additional rolls.

5. The method of claim 1, wherein said moving film has an electrostatic adherence zone of at least about 50 mm in length in the peripheral direction on the surface of at least one of said rolls of said set of rolls.

6. The method of claim 1, wherein said electric potential difference established between said set of conductive rolls is in the range of from about 300–3000 V.

7. The method of claim 1, wherein said moving film is a thermoplastic polymeric film with a volume resistivity of not less than $10^9$ ohm.cm.

8. The method of claim 1, wherein said moving film is a polyester film.

9. The method of claim 1, wherein said moving film is a laminated film comprising polyester layer and a thermoplastic polymeric layer.

10. The method of claim 1, wherein one roll of said set of rolls is grounded and a high voltage is applied to the other roll.

11. The method of claim 1, wherein said conductive elastomer has a surface hardness of not greater than 90°.

12. The method of claim 11, wherein said surface hardness of said conductive elastomer is not greater than 80° and not less than 60°.

13. The method of claim 1, wherein said surfaces of said conductive rolls are made of a highly wear-proof material.

14. The method of claim 1, wherein conductivity of said conductive rolls is expressed as a volme resistivity of not greater than $10^8$ ohm.cm.

15. The method of claim 1, wherein said moving film is preheated prior to introduction between said at least one set of conductive rolls.

16. The method of claim 1, wherein one of said rolls of said conductive rolls is a rigid-surface roll.

* * * * *